UNITED STATES PATENT OFFICE.

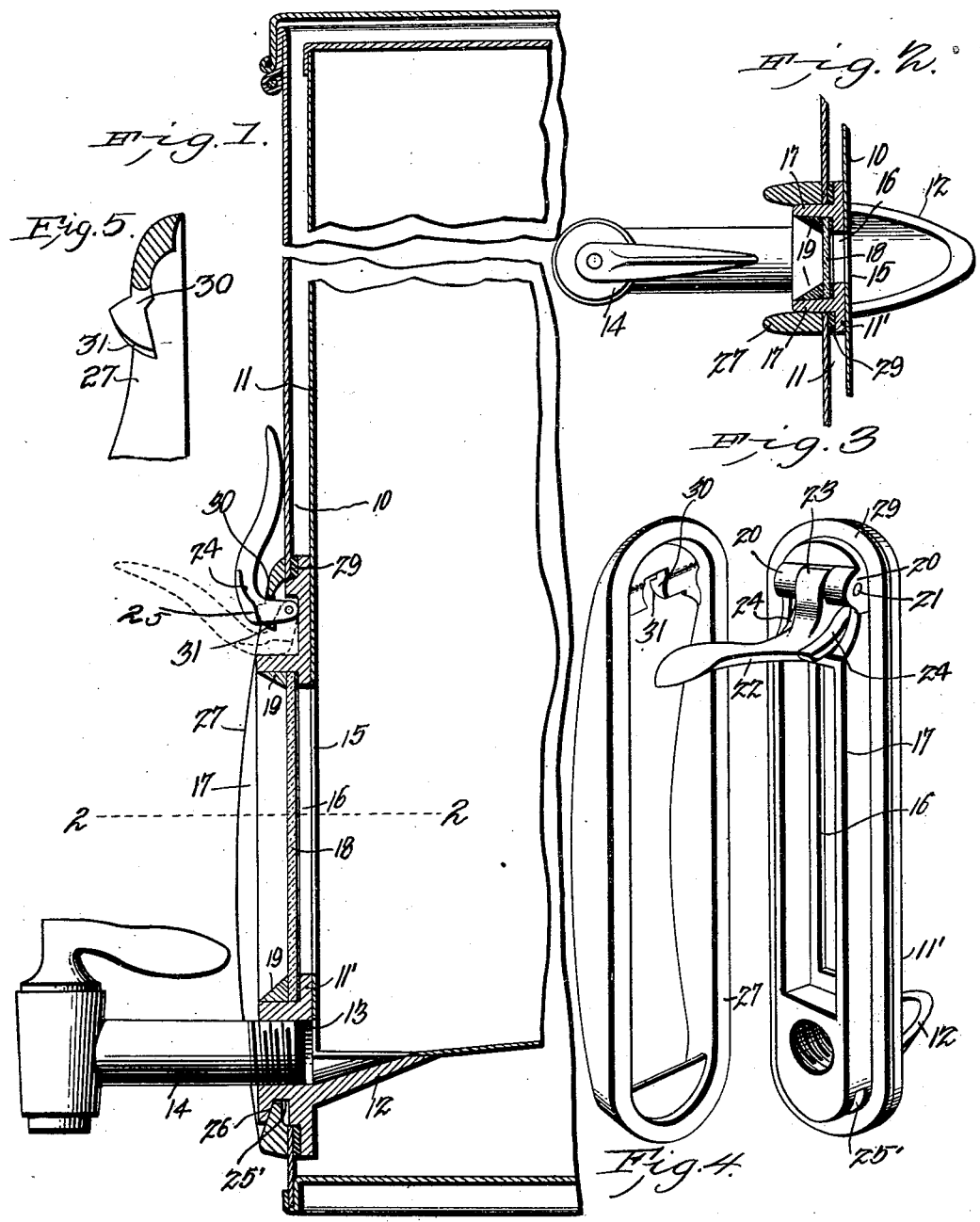

ANDREW KLAY AND THEODORE G. SCHEID, OF BLUFFTON, OHIO.

CREAM-SEPARATOR.

SPECIFICATION forming part of Letters Patent No. 714,194, dated November 25, 1902.

Application filed May 5, 1902. Serial No. 106,053. (No model.)

*To all whom it may concern:*

Be it known that we, ANDREW KLAY and THEODORE G. SCHEID, citizens of the United States, residing at Bluffton, in the county of Allen and State of Ohio, have invented a new and useful Cream-Separator, of which the following is a specification.

This invention relates to certain improvements in cream-separators of that class in which the cream-containing can is surrounded by water for the purpose of cooling the same and in which the cream is separated from the milk by the slow gravity process.

The object of the invention is to provide for the ready removal of the cream-can and its gage glass and cock from the water-containing vessel.

A further object is to connect the cream and water can in such manner as to form a perfectly-tight joint in order to prevent leakage of the water.

With these and other objects in view the invention consists in the novel construction and arrangement of parts hereinafter described, illustrated in the accompanying drawings, and particularly pointed out in the appended claims.

In the drawings, Figure 1 is a longitudinal sectional elevation illustrating a portion of a cream-separator constructed in accordance with our invention. Fig. 2 is a sectional plan view of the same on the line 2 2 of Fig. 1. Fig. 3 is a perspective view of the cock-carrying frame detached. Fig. 4 is a similar view of the detachable clamping-ring. Fig. 5 is a detail sectional view illustrating a portion of the clamping-ring as shown in Fig. 2 drawn to an enlarged scale.

Similar numerals of reference are employed to indicate corresponding parts throughout the several figures of the drawings.

10 designates the vessel for the reception of the milk and cream, and 11 a water-containing vessel in which the cream-can is placed, the water acting to cool the contents of the inner can and assist in the separation of the milk and cream by gravity.

To the cream-containing can is soldered or otherwise secured a plate 11', having at its lower portion a rearwardly-projecting lip 12, extending under the bottom of the can in order to permit of the withdrawal of the entire contents of the latter. The lower portion of the can has an opening communicating with the lip 12 and the adjacent discharge-opening 13, the latter being threaded for the reception of the threaded end of an ordinary form of discharge-cock 14. Above the opening 13 the can is provided with a vertically-elongated opening 15 in alinement with a similar opening 16 in the plate 10, and around the plate-opening is a forwardly-projecting flange 17, forming, in connection with the plate, a shouldered recess for the reception of a transparent panel 18, through which the contents of the can may be observed and the depth of cream determined. The panel may be secured in place by cement or putty 19 in the usual manner. Near the top of the outer face of the plate 11' is a pair of spaced lugs 20, having openings for the reception of a pivot-pin 21, on which is mounted a locking-lever 22, having a central pivot-lug 23 and provided with laterally-projecting wings having cam-faces 24 and terminating in locking-shoulders 25. At the bottom of the plate 11 is a recess 25', having an inclined wall 26 for the reception of an elongated clamping-ring 27, having its inner face inclined, as indicated in Fig. 5, in order to present a comparatively sharp edge for contact with the outer face of the water vessel 10, the latter having an elongated opening of a size sufficient to permit the passage of the projecting and flanged portions of the plate 11', a suitable packing-ring 29 being introduced between the inner face of the vessel 11 and the outer face of the plate 11' in order to form a liquid-proof joint. The lower cross-bar of the clamping-ring 27 enters the groove 25 and is provided with an inclined face for contact with the inclined face 26, so that when the clamping-ring is drawn upwardly it will be forced in against the outer wall of the cam and form a perfectly-tight and liquid-proof joint. At the upper end of the ring 27 is a recess 30 for the passage of the pivot-lug of the clamping-ring, and on either side of such recess are cams 31, adapted for contact with the projecting wings of the clamping-lever.

When it is desired to disconnect the two cans illustrated in Fig. 1, the lever is moved to the horizontal position, (indicated by dotted lines,) the outer face of the plate 11' forming a stop for limiting the movement of said lever. The clamping-ring is then pushed down until the lower cross-plate is moved out of the notch 25', after which the clamping-ring may be readily removed. The plate 11 and the cock and clamping-lever carried thereby may be withdrawn through the opening formed in the outer can and the cream-can removed from position. To reassemble the parts, the plate 11 and the parts carried thereby are pushed through the opening in the outer can, after which the clamping-ring is applied and the lever is moved to the vertical position, its cam-faces 24 coming into contact with the cam-faces 31 of the ring and elevating said ring until its lower portion is fully within the recess 25 and has been forced to the rear and against the surface of the water-can. The upper portion of the ring is also forced against the can by contact of the cam-surfaces, and when the lever finally reaches the vertical position (illustrated in full lines in Fig. 1) its shoulders 25 will be in engagement with the top of the cams 31 and the ring firmly clamped in place.

The cams may be made of such shape as to exert any required pressure between the clamping-ring and the outer surface of the can 10, and the joint formed will be fully as tight, if not tighter, than the joints formed in similar devices where auxiliary screw-fastenings are employed to connect the movable elements of the attachment.

While the construction herein described and illustrated in the accompanying drawings is the preferred form of the device, it is obvious that various changes in the form, proportions, size, and minor details of the structure may be made without departing from the spirit or sacrificing any of the advantages of the invention.

Having thus described our invention, what we claim is—

1. The combination with a cream-separator comprising a cream-can and an outer water-receptacle, of a plate secured to the cream-can and having a rearwardly-projecting lip extending under an opening in the can, a cock carried by said plate and communicating with the opening, an inclined locking-groove formed in said plate, communicating openings arranged in the can and plate, a transparent panel covering said openings, a clamping-ring having a portion adapted to enter said inclined locking-groove, and a lever carried by the plate and adapted to engage said clamping-ring.

2. The combination of the inner and outer cans, a flanged plate having an opening in alinement with a similar opening in the cream-can, a cock carried by the plate and communicating with said openings, an inclined locking-groove formed in said plate, a clamping-ring having a portion adapted to enter said groove, pivot-lugs carried by the upper portion of the plate, a clamping-lever pivoted to said lugs and having laterally-projecting cam-wings, and cams carried by the ring for contact with said wings.

3. The combination of the inner and outer cans, a flanged plate having an opening in alinement with a corresponding opening in the inner can, a cock in communication with said openings, a packing-ring arranged between the plate and the inner surface of the outer can, and a cam-lever adapted to effect both a longitudinal and a lateral clamping movement of said ring.

4. The combination with the inner and outer cans, of a flanged plate having openings in communication with similar openings in the inner can, a cock in communication with said openings, a packing-ring between the flanged plate and the inner face of the outer can, a clamping-ring having a beveled rear face to thereby form a sharp edge adapted to bite into the outer face of the can, and means for forcing and holding said rings against the outer face of said can.

5. The combination with the inner and outer cans, of the plate secured to the inner can and having a rearwardly-extending lip secured to the bottom of said can, communicating openings formed in the lip, the plate and the can, a cock carried by the plate and in communication with said openings, alining sight-openings formed in the plate and can, a transparent panel carried by the plate and covering said openings, an opening formed in the outer can for the passage of the projecting portion of the plate, there being in said projecting portion a groove having an inclined face, a clamping-ring having a lower bar inclined for contact with the inclined wall of said groove, pivot ears or lugs carried by the plate, a clamping-lever pivoted between said ears and having laterally-projecting cam-wings, and cams carried by the clamping-rings and adapted for contact with said wings, substantially as specified.

In testimony that we claim the foregoing as our own we have hereto affixed our signatures in the presence of two witnesses.

ANDREW KLAY.
THEODORE G. SCHEID.

Witnesses:
WM. S. CHASE,
H. J. CALL.